(No Model.) 2 Sheets—Sheet 2.
W. MILLS.
ELECTRIC BATTERY.
No. 588,591. Patented Aug. 24, 1897.
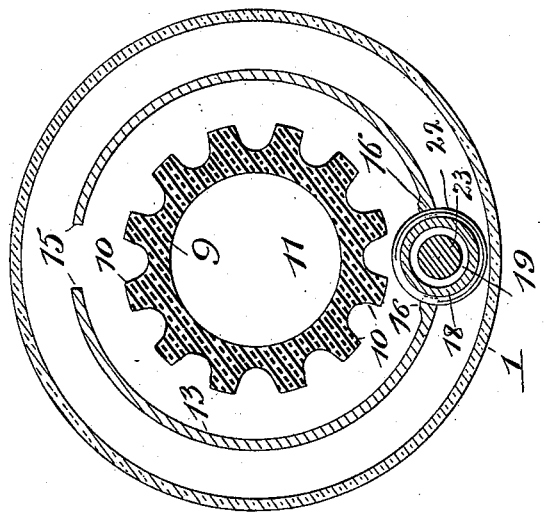
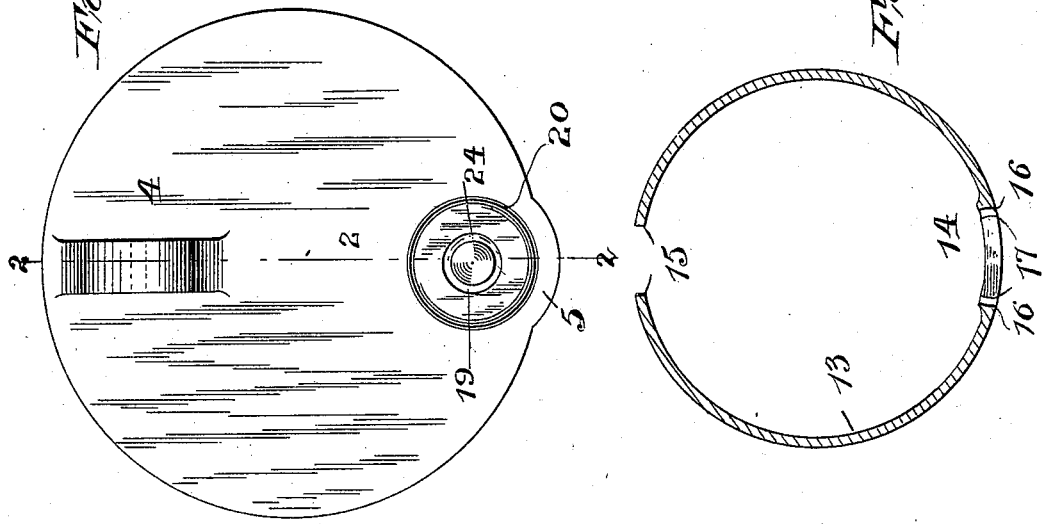
Attest,
C. W. Benjamin
Wm. Jacobsen
Inventor.
William Mills.
by Joseph L. Levy
his Atty.

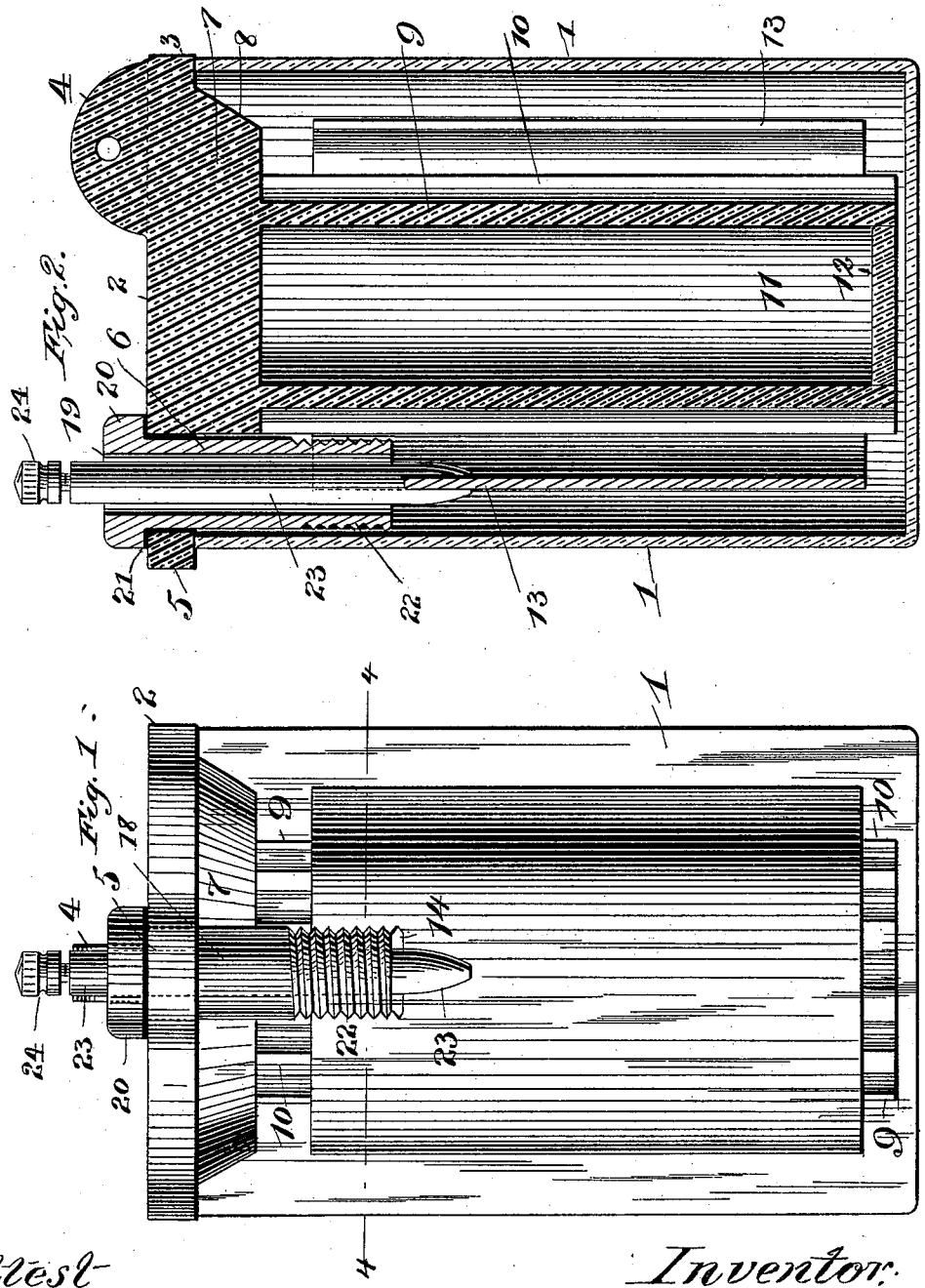

UNITED STATES PATENT OFFICE.

WILLIAM MILLS, OF ELIZABETH, NEW JERSEY, ASSIGNOR TO THE NEW YORK CARBON WORKS, OF NEW YORK, N. Y.

ELECTRIC BATTERY.

SPECIFICATION forming part of Letters Patent No. 588,591, dated August 24, 1897.

Application filed November 30, 1896. Serial No. 613,856. (No model.)

*To all whom it may concern:*

Be it known that I, WILLIAM MILLS, a citizen of the United States, residing at Elizabeth, county of Union, and State of New Jersey, have made certain new and useful Improvements in Electric Batteries, of which the following is a specification.

The object of my invention is to provide general improvements in electric batteries, and such improvements are embodied in the construction and combination of parts hereinafter described, and further pointed out in the claims.

In the drawings forming part of this specification, Figure 1 is a side elevation of the complete battery embodying my improvements; Fig. 2, a central sectional elevation taken on the plane of the line 2 2, Fig. 3; Fig. 3, a plan view of the same; Fig. 4, a transverse sectional view on the plane of the line 4 4, Fig. 1; and Fig. 5, a like view of the zinc element.

The first part of my invention relates to the peculiar construction of the carbon element, in which the carbon electrode has formed integrally therewith a supporting-cover and annular bars of less width than the cover, and a depending cylinder provided with longitudinal corrugations to increase the surface of the same, and the second part of my invention relates to supporting the zinc element from the cover and means for insulating the cover from the zinc.

In the drawings, 1 indicates a glass cell of any desired construction. At 2 is the disklike cover of the cell, which is provided with an annular flange 3, which rests upon the top of the glass cell or jar.

At one side the cover is provided with an upwardly-extending carbon lug 4, formed integrally therewith, to which a binding-post may be secured, and at the opposite side with a lug 5, in which an aperture 6 is formed, the lug 5 strengthening the cover about the aperture.

Below the top of the cover the integral carbon element is formed by a depending boss 7, which may have angularly-disposed sides 8, and depending from the central portion of the boss is the carbon element proper formed integrally of the cover and boss 8, the said carbon element 9 being cylindrical and provided with exterior longitudinal corrugations 10. In this way I provide a very desirable carbon element, making the element and the cover integral, the element being suspended directly from the cover, the corrugations increasing the surface of the element. Said element may be provided with a longitudinal chamber 11 for containing peroxid of manganese or any other desired material, and the bottom of the chamber can be closed by the plastic filling 12.

At 13 is the zinc element, of the usual circular-plate form, which is suspended about the carbon element 9 from the cover 2 and insulated therefrom, as distinguished from resting upon the bottom of the cell, the suspension of the zinc allowing perfect circulation of the fluid within the cell without necessitating perforation of the zinc.

For suspending the zinc from the cover 2 I employ an insulating-bushing, of porcelain or the like, which is detachably secured to the zinc, the bushing being supported by the cover 2. To provide for this detachable connection and at the same time allow of the ready connection of the zinc to an exterior wire, I cause the zinc element to be continued upwardly between the bushing. To carry this out and first to provide the detachable connection between the supporting and insulating bushing and the zinc, I cut or otherwise form a recess 14 in the top wall of the zinc, preferably opposite the unjoined ends 15 of the zinc, its side walls 16 being provided with a screw-thread 17, the walls being preferably reinforced or increased in thickness in order to provide as broad a thread as possible.

The bushing 18, which extends through the opening 6 in both the top 2 and boss 8, has a central opening 19 extending therethrough and a head or enlargement 20 at the top, which either rests upon the top of the cover 2 or may rest upon the top of an intervening gasket 21, of rubber or other material, to make a tight enough joint between the top and the bushing to prevent undue evaporation. The bushing 20 at its lower end is provided with an external screw-thread 22, which is adapted to engage the internal screw-thread 17, formed on the walls 16 or cut-out portion 14 of the zinc.

By passing the bushing through the hole 6 in the top 2 and screwing its end into the aperture 14 in the zinc a detachable and adjustable insulating connection for the zinc is formed which will suspend the zinc, as shown, from the top or cover of the cell above the bottom thereof, the curve of the internal thread 17 preventing to a certain extent disengagement of the bushing and zinc, the latter being capable of being raised or lowered to the desired height by screwing upon the bushing from the outside, while the elongated bearing for the bushing formed by the cover and bars prevents the zinc plate 13 coming in contact with the carbon 9 and dispenses with the employment of two supports for the zinc.

In order to more securely hold the bushing and zinc together and to continue the zinc up above the carbon top and to thoroughly insulate the zinc in its passage upwardly through the cover, I provide the zinc or other conducting rod 23, which is secured to the zinc element 13 below and within the cut-out part 14 by bifurcating the end of the rod, as shown clearly in Fig. 2, and securing the bifurcation to the body of the plates in any desired manner, the rod passing up through the aperture 19 in the bushing 20, the upper end of the rod being provided with the usual set-screw 24, the rod passing up through the bushing without touching the walls, which bushing, however, insulates the zinc from the carbon, the rod at the same time acting to prevent the disengagement of the bushing from the zinc by limiting the movement of the zinc on the bushing transversely of the aperture 14 should such occur.

It is apparent that the connection of the bushing and zinc may be made by means other than that herein described without departing from the spirit of my invention.

Having described my invention, I claim as new and desire to secure by Letters Patent—

1. The combination, in a battery, of the containing-cell, a cover therefor, the annular zinc element, an insulating-bushing detachably secured to the edge of said element, and a conducting-rod secured to said element below the bushing and passing upwardly and outwardly through said bushing, substantially as described.

2. The combination, in a battery, of the containing-cell, a cover therefor, the annular zinc element, an insulating-bushing having a circular aperture extending therethrough and detachably secured to the edge of said element, the bushing supporting the said element on the cover, and a circular conducting-rod secured to said element below the bushing and extending upwardly through said bushing, substantially as described.

3. In a battery, the combination with the containing-cell, and a cover therefor, of the zinc or other plate having a screw-thread formed therein, an opening in said cover, an insulating-body extending through said cover and provided with a screw-thread for detachably securing said body to the zinc and supporting said zinc from the cover, substantially as described.

4. In a battery, the combination with the containing-cell, and a cover therefor, of the zinc or other plate, and a screw-thread formed therein, an opening in said cover, an insulating-body extending through said opening in the cover and provided with a screw-thread for detachably securing said body to the zinc and supporting said zinc from the cover, and an exterior connection for the zinc extending to the zinc through said body, substantially as described.

5. The combination with the containing-cell, of the cover therefor, an opening in the cover, an apertured bushing resting upon said cover, said bushing having an exterior screw-thread at its lower end, the zinc or other plate, a recess formed in the upper edge of said plate provided with an internal screw-thread, both threads engaging to support the zinc by the bushing from the cover, and a conducting-rod secured to the zinc and extending upwardly therefrom through the bushing, substantially as described.

6. In a battery, the combination with a containing-cell, a depending carbon element and a supporting-cover therefor, of the annular zinc element embracing the carbon, an insulating-bushing detachably secured to the zinc element below the latter's upper edge, and supported on said cover, and means comprising a separate conducting-rod passing loosely through the bushing and secured to said element below its upper edge, said means limiting transverse movement of said zinc element in relation to the bushing, substantially as described.

7. The combination with the element formed of a plate of zinc, a recess formed in one of its edges, the vertical walls of which recess are reinforced, a screw-thread formed in the walls of said recess, and a supporting-bushing provided with an external screw-thread for engaging the first-mentioned screw-thread, substantially as described.

8. The combination with the cell 1 and cover 2, of the annular zinc plate, and a cylindrical insulating-bushing detachably secured to said plate below its upper edge, the bushing having a projection resting on said cover, substantially as described.

9. The combination with a zinc or other electrode, of a hollow insulating-bushing detachably secured directly thereto, and a conducting-rod passing loosely through said bushing and secured to the said electrode independently of the attachment of the bushing to the said electrode, substantially as described.

10. The combination with the zinc or other electrode having a screw-threaded recess formed in its edge, of a conducting-rod secured to said zinc at the bottom of said recess, and a hollow insulating-bushing provided with an exterior screw-thread to engage the thread on the zinc, said rod extending through said bushing, substantially as described.

11. In a battery, the combination with the containing-cell, of the integrally-formed element comprising the top or cover adapted to rest on the cell, a boss depending from and of less diameter than the top, a carbon-body depending from and of less diameter than the boss, the top and boss having an aperture formed therein outside of said body, an annular plate encircling said carbon-body, an insulating-bushing having a head resting on said cover and passing through said aperture and detachably secured to the plate below its upper edge, a binding-post exterior to the bushing, and a rod extending loosely through the bushing and between the binding-post and said plate, the boss and top forming an elongated bearing for bushing, substantially as described.

Signed at the city, county, and State of New York this 28th day of November, 1896.

WILLIAM MILLS.

Witnesses:
B. S. WISE,
WILLIAM JACOBSEN.